US008084969B2

(12) United States Patent
David et al.

(10) Patent No.: US 8,084,969 B2
(45) Date of Patent: Dec. 27, 2011

(54) HALL-EFFECT BASED LINEAR MOTOR CONTROLLER

(75) Inventors: Paul David, Bow, NH (US); Shaun D. Milano, Chichester, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 357 days.

(21) Appl. No.: 11/865,118

(22) Filed: Oct. 1, 2007

(65) Prior Publication Data
US 2009/0085558 A1 Apr. 2, 2009

(51) Int. Cl.
H02K 41/00 (2006.01)
H02K 41/02 (2006.01)

(52) U.S. Cl. ............... 318/135; 396/75; 396/72; 396/77; 396/80; 396/82; 396/83; 396/85; 396/133; 318/685; 318/696; 359/698; 359/696; 359/697; 359/676; 359/694; 359/677; 310/12.01; 310/12.02; 310/12.16

(58) Field of Classification Search ................... 318/135, 318/119, 687, 685, 696; 310/12.01, 12.08, 310/12.16, 12.19, 13, 14, 15; 360/266.2, 360/266.4, 267.7; 396/75, 72, 77, 80, 82, 396/85, 133; 359/698, 696, 697, 676, 694, 359/677
See application file for complete search history.

(56) References Cited

U.S. PATENT DOCUMENTS

| 3,836,835 | A | * | 9/1974 | Sawyer ......................... 318/685 |
| 3,878,411 | A | * | 4/1975 | Nocito et al. .............. 310/12.19 |
| 4,424,589 | A | * | 1/1984 | Thomas et al. ............... 382/317 |
| 4,455,512 | A | * | 6/1984 | Cornwell et al. ............ 318/135 |
| 4,456,934 | A | | 6/1984 | Wedman et al. |
| 4,527,108 | A | * | 7/1985 | Enda ............................ 318/687 |
| 4,748,393 | A | | 5/1988 | Fincher et al. |
| 4,893,071 | A | * | 1/1990 | Miller ........................... 324/660 |
| 4,897,582 | A | * | 1/1990 | Otten et al. ................... 318/135 |
| 5,289,088 | A | * | 2/1994 | Andoh .......................... 318/135 |
| 5,389,864 | A | | 2/1995 | Tryan et al. |
| 5,801,462 | A | * | 9/1998 | Yagoto et al. ............. 310/12.19 |
| 5,838,374 | A | * | 11/1998 | Kikuchi ....................... 348/351 |
| 5,838,515 | A | * | 11/1998 | Mortazavi et al. ......... 360/78.12 |
| 5,865,832 | A | * | 2/1999 | Knopp et al. ................... 606/10 |
| 5,880,586 | A | * | 3/1999 | Dukart et al. ............. 324/207.2 |

(Continued)

FOREIGN PATENT DOCUMENTS

EP 1855135 A1 11/2007

(Continued)

OTHER PUBLICATIONS

Invitation to Pay Additional Fees with Partial Search Report for PCT/US2008/075560, dated Nov. 18, 2009, 5 pages.

(Continued)

*Primary Examiner* — Rita Leykin
(74) *Attorney, Agent, or Firm* — Daly, Crowley, Mofford & Durkee, LLP

(57) ABSTRACT

A linear motion control device for use in a linear control system is presented. The linear motion control device includes a coil driver to drive a coil that, when driven, effects a linear movement by a motion device having a magnet. The linear motion control device also includes a magnetic field sensor to detect a magnetic field associated with the linear movement and an interface to connect an output of the magnetic field sensor and an input of the coil driver to an external controller. The interface includes a feedback loop to relate the magnetic field sensor output signal to the coil driver input.

1 Claim, 10 Drawing Sheets

U.S. PATENT DOCUMENTS

| | | | | |
|---|---|---|---|---|
| 5,955,798 | A * | 9/1999 | Ishiyama et al. | 310/12.14 |
| 5,965,963 | A * | 10/1999 | Chitayat | 310/12.01 |
| 5,979,760 | A * | 11/1999 | Freyman et al. | 235/454 |
| 6,034,499 | A * | 3/2000 | Tranovich | 318/650 |
| 6,118,245 | A * | 9/2000 | Sienz et al. | 318/687 |
| 6,181,882 | B1 * | 1/2001 | Murashima et al. | 396/406 |
| 6,285,154 | B1 | 9/2001 | Yasuda et al. | |
| 6,400,046 | B1 | 6/2002 | Hwang et al. | |
| 6,404,154 | B2 * | 6/2002 | Marcinkiewicz et al. | 318/400.07 |
| 6,702,809 | B1 * | 3/2004 | Knopp et al. | 606/10 |
| 6,853,507 | B2 * | 2/2005 | Ryu et al. | 359/824 |
| 7,230,366 | B2 * | 6/2007 | Sasaki et al. | 310/323.17 |
| 7,268,515 | B1 * | 9/2007 | Tsai et al. | 318/801 |
| 7,288,913 | B2 * | 10/2007 | Yoshitomi et al. | 318/603 |
| 7,288,914 | B2 * | 10/2007 | Yoshitomi et al. | 318/603 |
| 7,295,907 | B2 | 11/2007 | Lu et al. | |
| 7,590,334 | B2 | 9/2009 | Yabusaki et al. | |
| 7,747,146 | B2 | 6/2010 | Milano et al. | |
| 7,770,231 | B2 * | 8/2010 | Prater et al. | 850/6 |
| 2002/0034036 | A1 | 3/2002 | Sri-Jayantha et al. | |
| 2004/0012682 | A1 | 1/2004 | Kosaka et al. | |
| 2007/0047942 | A1 | 3/2007 | Chang et al. | |
| 2008/0066548 | A1 * | 3/2008 | Jajtic et al. | 73/514.39 |
| 2008/0130134 | A1 | 6/2008 | Ishida et al. | |
| 2008/0265825 | A1 * | 10/2008 | Su | 318/685 |

FOREIGN PATENT DOCUMENTS

| | | |
|---|---|---|
| KR | 10-0691245 | 2/2007 |
| WO | WO 2006/049039 A1 | 5/2006 |

OTHER PUBLICATIONS

Datasheet, Allegro Microsystems, Inc., A3904, "Low Voltage Voice Coil Motor Driver", 2007-2008, 9 pages.

Datasheet, Allegro Microsystems, Inc., A1442, "Low Voltage Full Bridge Brushless DC Motor Driver with Hall Commutation and Soft-Switching, and Reverse Battery, Short Circuit, and Thermal Shutdown Protection", 2005, 2006, 8 pages.

Datasheet, Allegro Microsystems, Inc., A1391, A1392, A1393, and A1395, "Micro Power 3V Linear Hall Effect Sensors with Tri-State Output and User-Selectable Sleep Mode", 2005-2008, 15 pages.

Application Information, Allegro Microsystems, Inc., "Closed-Loop Speed Control for the A3932/A3936", by Peter Todd, Oct. 23, 2003, 5 pages.

Application Information, Allegro Microsystems, Inc., "Fully Integrated Hall Effect Motor Driver for Brushless DC Vibration Motor Applications", by Shaun Milano, 2007, 7 pages.

Notification of Transmittal of the International Search Report and the Written Opinion of the International Searching Authority, or the Declaration, PCT/US2008/075560, dated Apr. 8, 2010, 1 page.

International Search Report, PCT/US2008/075560, dated Apr. 8, 2010, 6 pages.

Written Opinion of the International Searching Authority, PCT/US2008/075560, dated Apr. 8, 2010, 10 pages.

PCT Notification with International Preliminary Report on Patentability dated Apr. 29, 2010 for PCT/US2008/075560 filed on Sep. 8, 2008.

"Using Internal Calibration and Right Shifting (Scalable Dynamic Ranging) on the DS1863/DS1865 to Enhance ADC Performance", Application Note 3903, Maxim Integrated Products, Aug. 18, 2006, 10 pages.

"New ICs Revolutionize the Sensor Interface", Application Note 695, Maxim Integrated Products, Jan. 10, 2001, 8 pages.

Jacobsen, Eric, "A Cookbook Approach to Designing a Differential-Signal Amplifier for Sensor Applications", AN1557/D, Motorola, Freescale Semiconductor, Inc., 1996, 10 pages.

Gilbert, Joe and Dewey, Ray, "Linear Hall-Effect Sensors", Application Note 27702A, Dec. 3, 1998, 12 pages.

Self-Calibrating TPOS Speed Sensor Optimized for Automotive Cam Sensing Applications, ATS675LSE, Allegro MicroSystems, Inc., 2008, 13 pages.

Self-Calibrating, Zero-Speed Differential Gear Tooth Sensor with Continuous Update, ATS643LSH, Rev. 2, Allegro MicroSystems, Inc., 2004, 2006, 16 pages.

Notification of Transmittal of the International Search Report and the Written Opinion of the International Searching Authority, or the Declaration, PCT/US2009/031632 dated Oct. 1, 2009, 1 page.

The International Search Report, PCT/US2009/031632 dated Oct. 1, 2009, 4 pages.

Written Opinion of the International Searching Authority, PCT/US2009/031632 dated Oct. 1, 2009, 10 pages.

Anonymous: "Method for Calibration of Position Servo Devices", IBM Technical Disclosure Bulletin, IBM Corp., New York, US, vol. 26, No. 4, Sep. 1, 1983, pp. 1818-1821, XP002111808, ISSN: 0018-8689.

File downloaded from PAIR for U.S. Appl. No. 12/139,539, filed Jun. 16, 2008, file through Jul. 2, 2010, 309 pages.

Office Action dated Aug. 10, 2010, U.S. Appl. No. 12/139,539, filed Jun. 16, 2008, 5 pages.

File downloaded from PAIR for U.S. Appl. No. 12/139,539, filed Jun. 16, 2008, file from Jul. 2, 2010 through Jan. 17, 2011, 121 pages.

* cited by examiner

HALL-EFFECT BASED LINEAR MOTOR CONTROLLER

CROSS-REFERENCE TO RELATED APPLICATIONS

Not applicable.

STATEMENT REGARDING FEDERALLY SPONSORED RESEARCH

Not applicable.

FIELD OF THE INVENTION

This invention relates generally to linear motion control.

BACKGROUND OF THE INVENTION

Closed-loop control in a linear motion control system does not require adjustments to be made in order to achieve a desired output (or maintain a constant output) despite varying conditions. Typically, closed-loop control is performed by a microcontroller executing firmware that compares the system's output signal with a desired command to determine the drive for the system. Thus, drive input is adjusted until the output signal matches the desired command.

In some linear positioning applications, the microcontroller uses output signal data from a number of different components, including a position sensor. For example, in small linear motor applications, a magnetic field sensor such as a Hall-Effect sensor may be used to sense motor position, which is then used by the microcontroller to supply a drive current to the motor. In linear motion control applications without position sensor feedback, a co-processor (such as digital signal processor) may be used to derive the position information, for example, by characterizing linear displacement as a function of drive current.

Closed-loop control of this kind is not without problems, however. To ensure loop stability, it is often necessary to operate the system very slowly. Such operation results in long response times to changes in the motor's position. Also, precise linear motion control may be difficult to achieve due to hysteresis in the motor's mechanical movement.

SUMMARY OF THE INVENTION

In general, in one aspect, the invention is directed to a linear motion control device ("device"). The device includes a coil driver to drive a coil that, when driven, effects a linear movement by a motion device having a magnet. The device further includes a magnetic field sensor to detect a magnetic field associated with the linear movement and to produce an output signal in response thereto. Also included is an interface to connect an output of the magnetic field sensor and an input of the coil driver to a controller. The interface includes a feedback loop to relate the magnetic field sensor output signal to the coil driver input.

Embodiments of the invention may include one or more of the following features. The interface may include a difference amplifier to receive as inputs the magnetic field sensor output signal and an input signal provided by the controller, and to produce an output signal from such inputs. The output signal produced by the difference amplifier may be received as an input signal at the coil driver input. The magnetic field sensor may be a Hall sensor or a magneto-resistive sensor. The coil driver may be connected to the coil to drive current through the coil in one direction or more than one direction. The coil driver may be a voice coil driver or a linear motor driver implemented with an H-bridge circuit. The coil driver, magnetic field sensor and interface may be integrated as a semiconductor integrated circuit.

In another aspect, the invention is directed to a method of focusing a lens in a camera module. A displacement range for the lens is determined and used to request a desired displacement of the lens. The request is provided to a device that then causes movement of the lens by a voice coil actuator, by using an internal control loop to adjust a drive current supplied to a coil of the voice coil actuator.

Particular implementations of the invention may provide one or more of the following advantages. The internal sensor-to-driver feedback can compensate for linear motion device (e.g., voice coil actuator, linear motor, speakers) non-linearities as well as mechanical hysteresis. In camera lens focusing applications, the determination of the lens displacement range in conjunction with the sensor-to-driver feedback can calibrate the control to a specific lens assembly.

BRIEF DESCRIPTION OF THE DRAWINGS

The foregoing features of the invention, as well as the invention itself may be more fully understood from the following detailed description of the drawings, in which.

DETAILED DESCRIPTION

Figure 1:
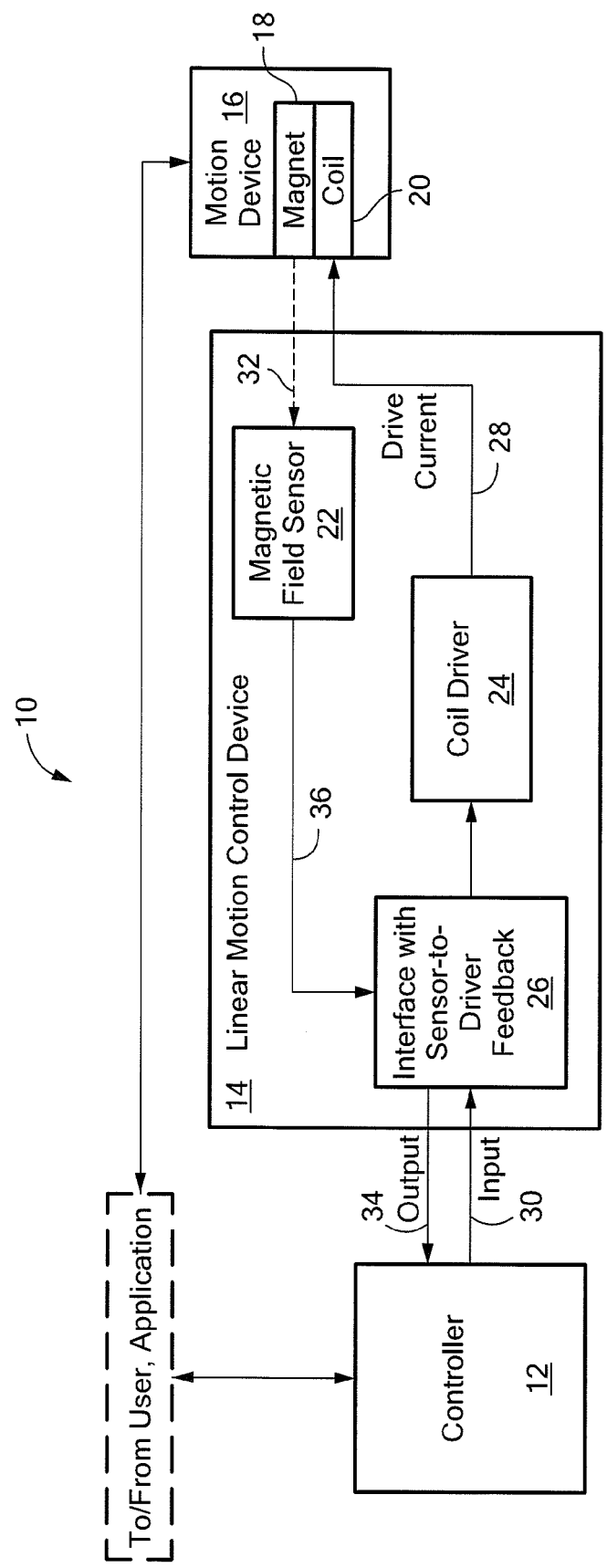
FIG. 1 is a block diagram of an exemplary control system employing a linear motion control device that includes a magnetic field sensor, a coil driver and an interface to provide sensor-to-driver feedback.

FIG. 1 shows a control system 10 that provides closed-loop linear motion control to a positioning application. The control system 10 includes a controller 12 connected to a linear motion control device (or "device") 14. The control system 10 also includes a motion device 16, which includes a magnet 18 and a coil 20. In the described embodiments, the magnet 18 is movable relative to the coil 20. The control system 10 controls the movement of the magnet 18 with the coil 20. The motion device 16 may be any type of linear motion device, for example, a linear motor or linear voice coil actuator. The positioning application may be any application that involves or utilizes linear displacement of such a motion device's magnet.

The linear motion control device 14 includes a magnetic field sensor 22, a coil driver 24 and an interface 26. The magnetic field sensor 22 may be any magnetic field sensing device, for example, a Hall-effect sensor (Hall sensor) or some kind of magneto-resistive (MR) sensor. The device 14 provides to the coil 20 a current signal 28 that is related to an electrical input signal 30 received from the controller 12. The device 14 uses the magnetic field sensor 22 to detect magnetic field strength 32 and, based on that detection, returns an electrical signal (shown as output signal 34) to the controller 12.

Still referring to FIG. 1, the interface 26 serves to interface the magnetic field sensor 22 to the controller 12 and the coil driver 24 to the controller 12 via output signal 34 and input signal 30, respectively. The interface 26 also couples the magnetic field sensor 22 to the coil driver 24. It receives the output of the magnetic field sensor 22 as an input voltage signal 36 and provides an output voltage signal to the coil driver 24, which the coil driver 24 converts to a drive current (current signal 28) to be applied to the coil 20. The interface 26 thus provides a feedback loop from the magnetic field sensor 22 to the coil driver 24, as will be described in further detail later with reference to FIG. 2. The sensor-to-driver feedback of the interface 26 allows a user to request (via controller 12) a single value and have the system self stabilize. In other words, the sensor-to-driver feedback loop allows the system to correct position based on sensor feedback without intervention by the controller 12 (and/or user), or the need for other components, such as a linear positioning encoder, to provide positional feedback information.

Figure 2:
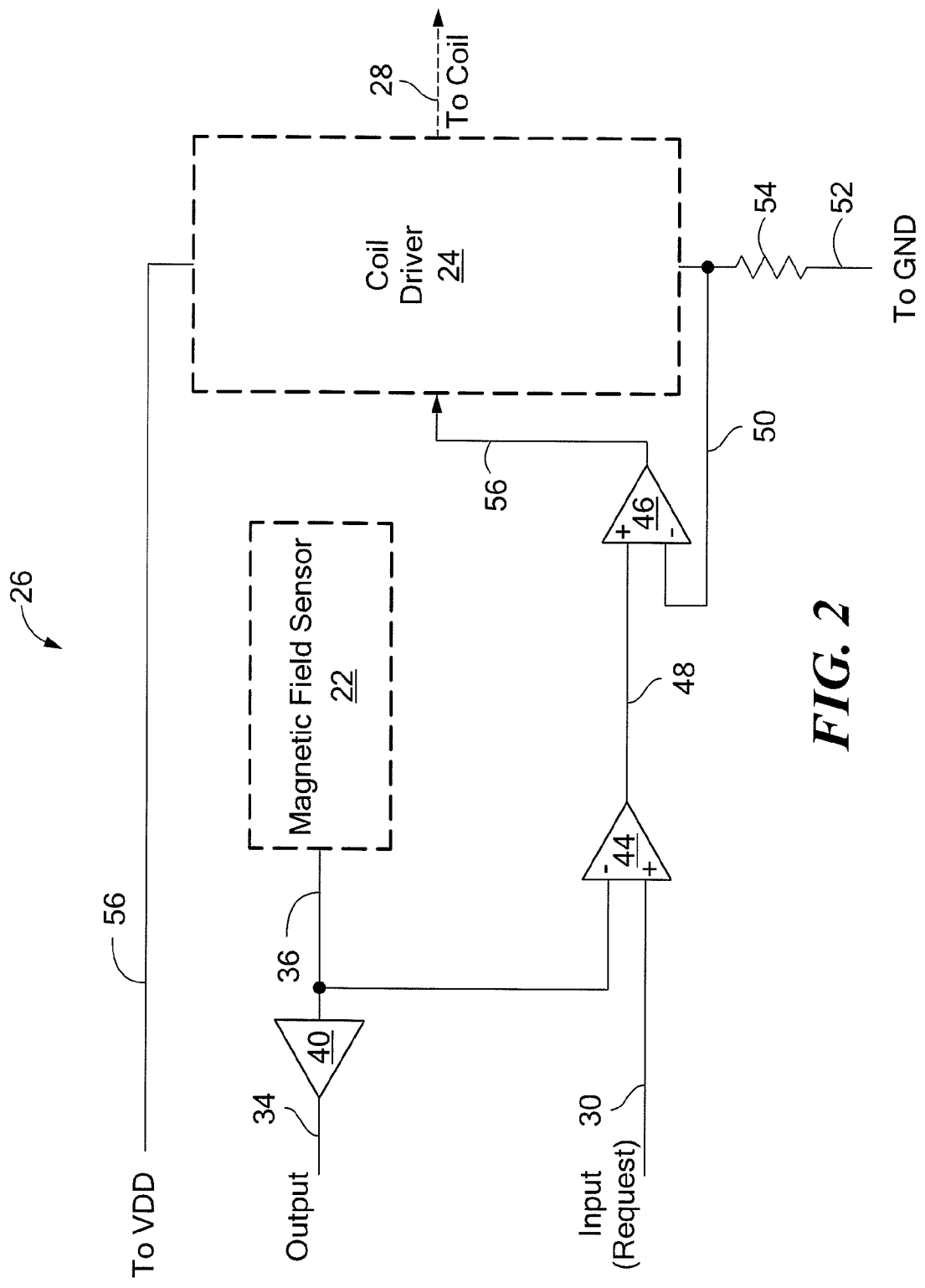
FIG. 2 is a schematic diagram of the interface (from FIG. 1)

Referring to FIG. 2, the interface 26 includes a buffer 40 that passes the magnetic field sensor output 36 to the controller 12 as output signal 34. In addition, the interface 26 includes a first amplifier 44 and a second amplifier 46. The first amplifier 44 is a high-gain difference amplifier that operates as a comparator. It receives as inputs the input signal 30 from the controller 12 and the magnetic field sensor output signal 36. It generates an output signal 48 based on the signals 30 and 36, and that output signal 48 is provided as one of the input signals to the second amplifier 46. The other amplifier input (for second amplifier 46), input signal 50, is coupled to the coil driver 24 and connects to ground 52 through a sense resistor 54. The second amplifier's output signal is shown as a coil driver input 56. The components 46 and 54 (and associated connections), although shown as part of the interface 26, could instead be included as part of the coil driver 24. In such a partitioning, the output of the comparator (output signal 48) would be an input of the coil driver 24. Also shown in FIG. 2 is a supply voltage line 56, which connects the coil driver 24 to an external supply voltage ("VDD"). It is the inclusion of the comparator 44 as a feedback element that allows an internal (to device 14) closed loop control to be achieved. It will be appreciated that other circuitry may be included, for example, microcontroller interface, signal shaping, or filtering components, according to the needs of a particular design.

The signal 30 provided by the controller to the interface 26 of device 14 may be a pulse width modulation (PWM) input signal or analog, but serial interfaces could also be easily implemented. If a PWM input is used, it will be translated into an analog reference voltage. Referring to FIGS. 1-2, the linear motion control device 14 operates as follows. The feedback circuitry of the interface 26 drives current through the coil 20. The current in the coil 20 changes until the position of the motion device 16 results in a magnetic field sensor output voltage (output 36) that has a predetermined relationship with respect to the input 30, such as matching the input 30 (or the PWM converted internal analog signal, if a PWM input is used, or serial reference).

Figure 3:
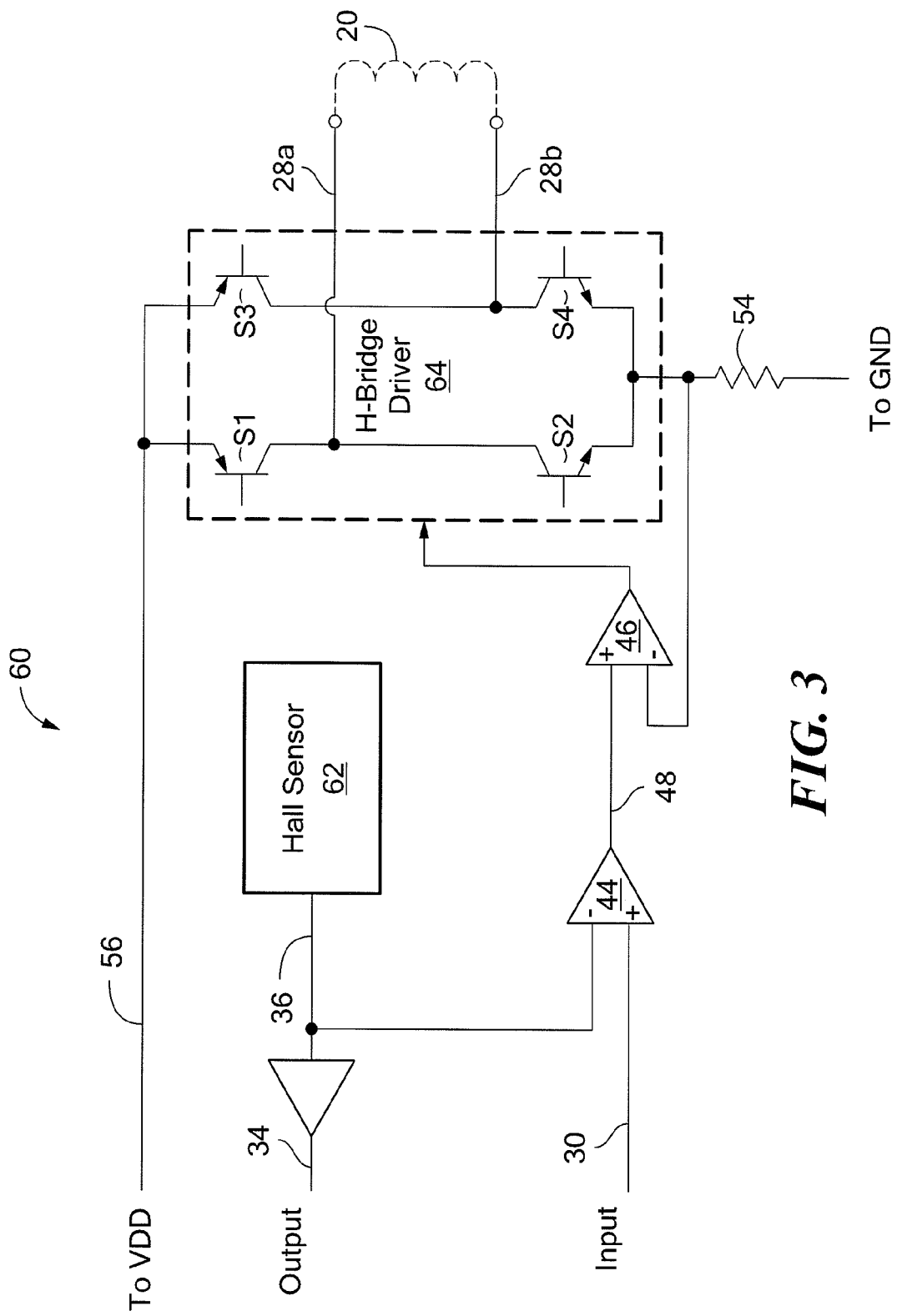
FIG. 3 is a partial block, partial schematic diagram of the linear motion control device (from FIG. 1) implemented with a Hall sensor and an H-budge coil driver for driving an external linear motor.

Referring to FIG. 3, an exemplary embodiment of the device 14 that is particularly well-suited to linear motor drive and control is shown as device 60. The types of linear motors that might be controlled/driven by such a device include small linear motors such as vibration motors, shutter triggers, polarization filters, speaker control, to give but a few examples. In this embodiment, the magnetic field sensor 22 and the coil driver 24 (from FIG. 1) are implemented as a Hall-Effect sensor (or Hall sensor) 62 and an H-bridge driver 64, respectively. An H-bridge driver provides for bidirectional current flow, thus enabling the linear motor to run in a forward and reverse direction. Drive current output 28 (from FIG. 1) is shown here to include a first output 28a which connects to one end of an external coil (coil 20 from FIG. 1) and a second output 28b which connects to the other end of the external coil. In the illustrated embodiment, the H-bridge is constructed with four solid-state switches (labeled S1, S2, S3, S4, in the figure). When S1 and S4 are closed (and S2 and S3 are open) current flows through the coil 20 in one direction. Opening S1 and S4 and closing S2 and S3 causes current to flow through the coil 20 in the reverse direction.

Figure 4:
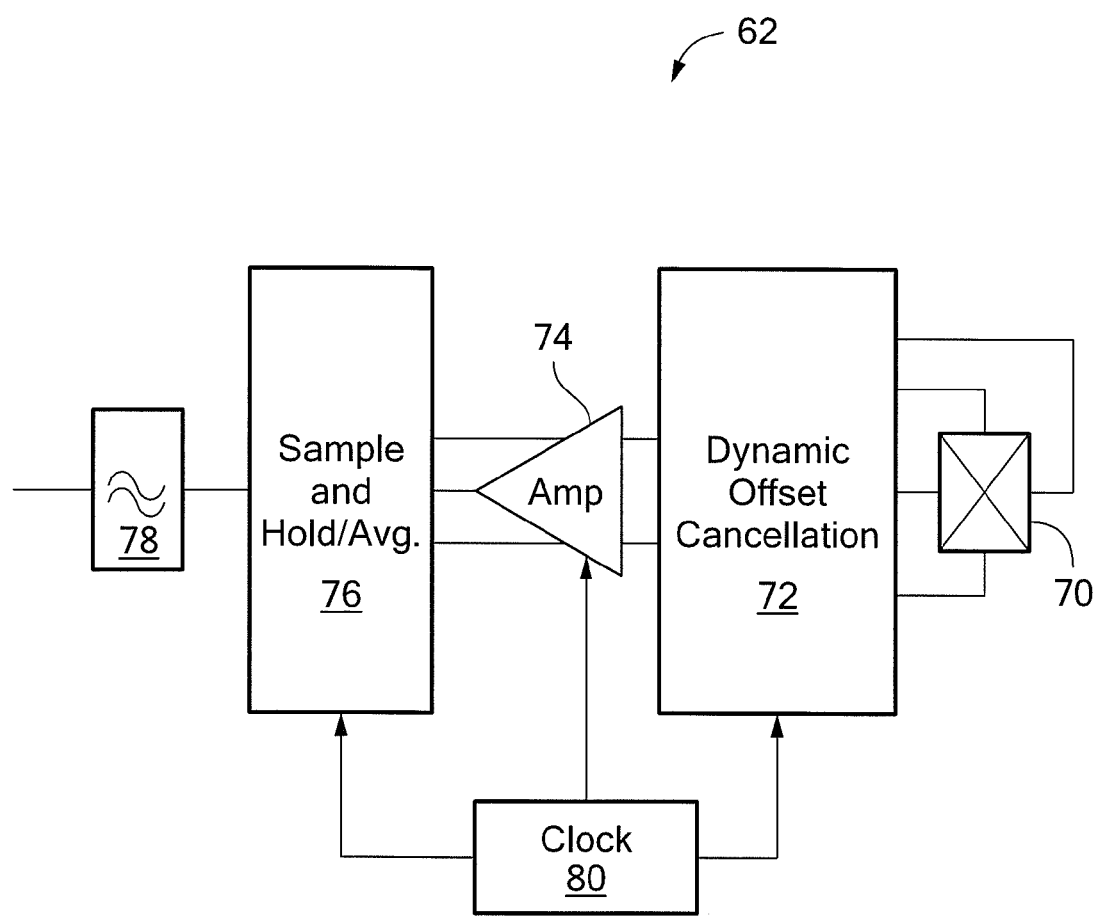
FIG. 4 is a block diagram of a Hall sensor that may be used in the linear motion control device of FIG. 3.

FIG. 4 shows one simplified example of a Hall sensor that can be used for the Hall sensor 62 (from FIG. 3). Other Hall sensor designs could be used as well. The Hall sensor 62 includes a Hall element 70 as well as various signal conditioning components, for example, a dynamic offset cancellation circuit 72 (that uses chopper stabilization), an amplifier 74, a sample and hold (and averaging) circuit 76 and a low pass filter 78. A clock circuit 80 provides timing signals to the dynamic offset cancellation circuit 72, amplifier 74 and sample and hold (and averaging) circuit 76, as indicated. In speaker applications, where absolute offset is less important than in other types of applications, a non-chopped element may be useful from a bandwidth perspective.

Figure 5:
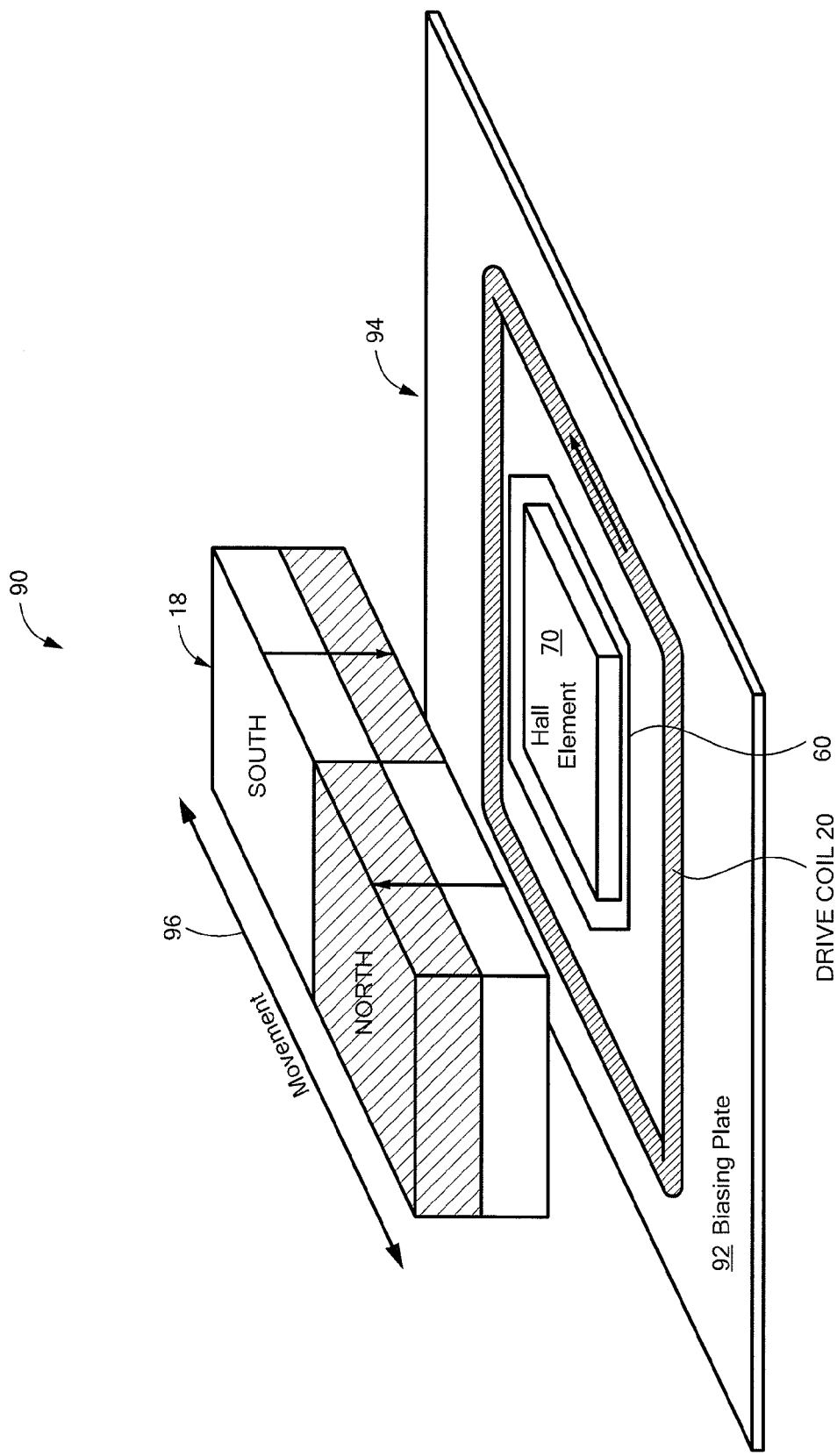
FIG. 5 shows an exemplary magnet and coil/magnet assembly.
Figure 6:
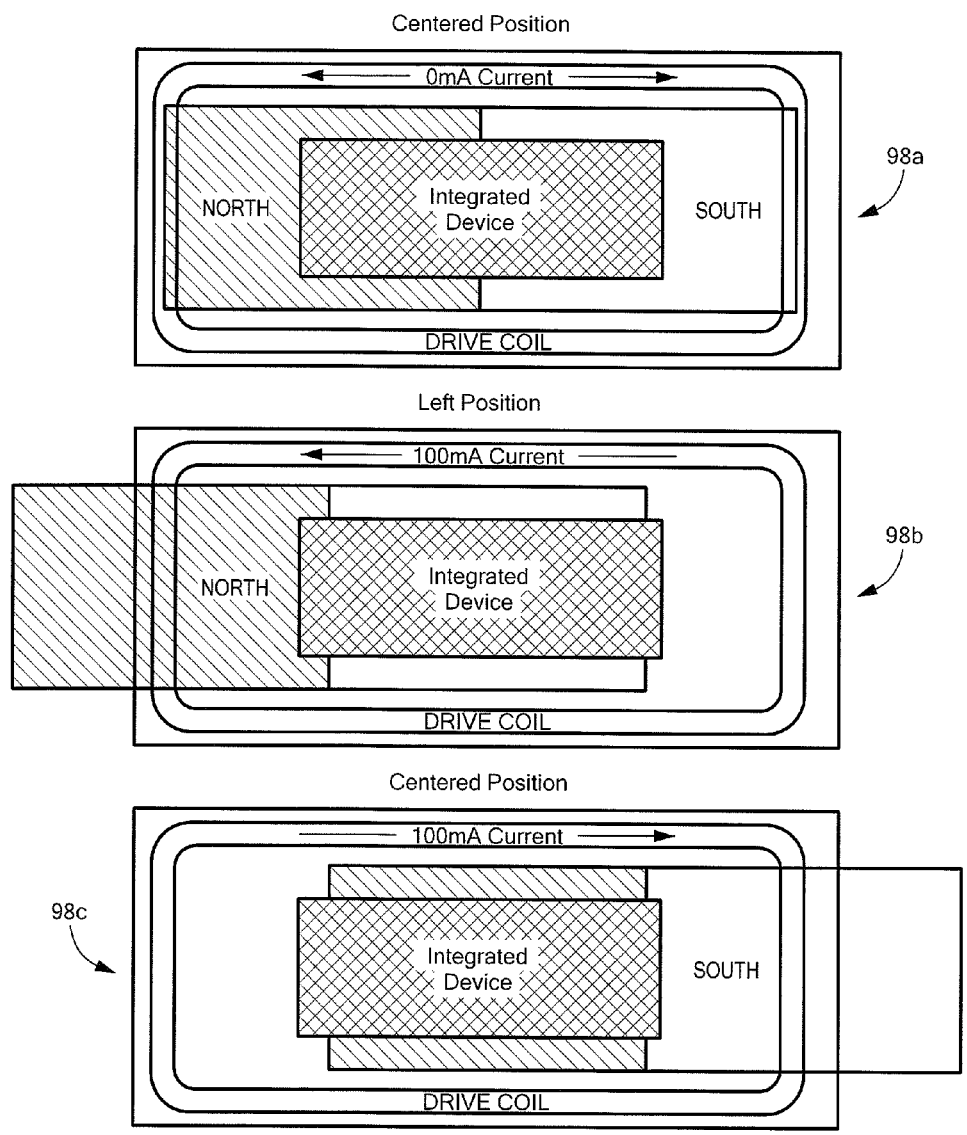
FIG. 6 shows the positioning of the magnet relative to the coil and the linear motion control device (implemented as a semiconductor integrated circuit)

In one exemplary embodiment, as shown in FIGS. 5-6, the linear motion control device 14 is implemented as a semiconductor integrated circuit (IC). That is, the magnetic field sensor is integrated with the circuitry of the coil driver and interface on a single semiconductor substrate. Therefore, the device 14 may be manufactured and sold as an IC for use in a module design.

FIGS. 5-6 show an exemplary magnet and device/coil assembly 90. In the mechanical system shown in FIGS. 5-6, the magnet 18 moves relative to a stationary coil. The assembly 90 is part of a motor (not shown in its entirety), which would be connected to a device or structure to be moved for a given application. Thus, FIGS. 5 and 6 depict an implementation in which the integrated device 60 is mounted or embedded in a motor. Referring to FIGS. 5 and 6, the integrated device 60 (that includes the Hall element 70) is connected to the coil 20 (shown as drive coil 20) and the coil 20 is mounted to a biasing plate 92 in a device/coil structure 94. The magnet 18 is suspended above the device/coil structure 94 by a mechanical suspension system (not shown) that allows the magnet 18 to move along the desired path of motion (indicated by arrow 96). The magnet 18 shown in the figure is configured as a pair of magnets with opposite orientation. That is, the south magnetic pole of one magnet and north magnetic pole of the other magnet (in the magnet pair) each face the Hall element 70. The magnet 18 moves in a horizontal plane above the sensing face of the Hall element 70 in what is referred to as a "bipolar slide-by" mode of operation. Other magnet configurations and modes may be used. The illustrated configuration/mode allows improved sensing precision for smaller magnet travel.

Referring to FIG. 6, in the absence of a current in the coil 20, the biasing plate 92 causes the magnet 18 to be centered over the coil/device structure 94 ("center position", indicated by reference numeral 98a). When a current is applied by the coil driver to the coil 20, the flux generated by the energized coil 20 interacts with flux generated by the magnet 18. This interaction causes the magnet 18 to react with a force either in one direction or the opposite direction depending on the polarity of the coil flux. That is, the appropriate poles of the magnet 18 are either attracted or repelled to produce the force. The stronger the current is the stronger the resulting force is. In the illustration of FIG. 6, an application of a positive 100 mA drive current to the coil 20 results in the magnet 18 moving to the left position ("left position", indicated by reference numeral 98b) and an application of a negative 100 mA drive current to the coil 20 (i.e., a drive current of 100 mA flowing in the opposite direction through the coil) results in the magnet 18 moving to the right position ("right position", indicated by reference numeral 98c). Therefore, in the embodiment of FIGS. 3-6, the device 60 operates over both magnetic poles of the magnet 18 as well as drives the current in both directions through the coil 20 to effect the magnet movement depicted in FIGS. 5-6.

Figure 7:
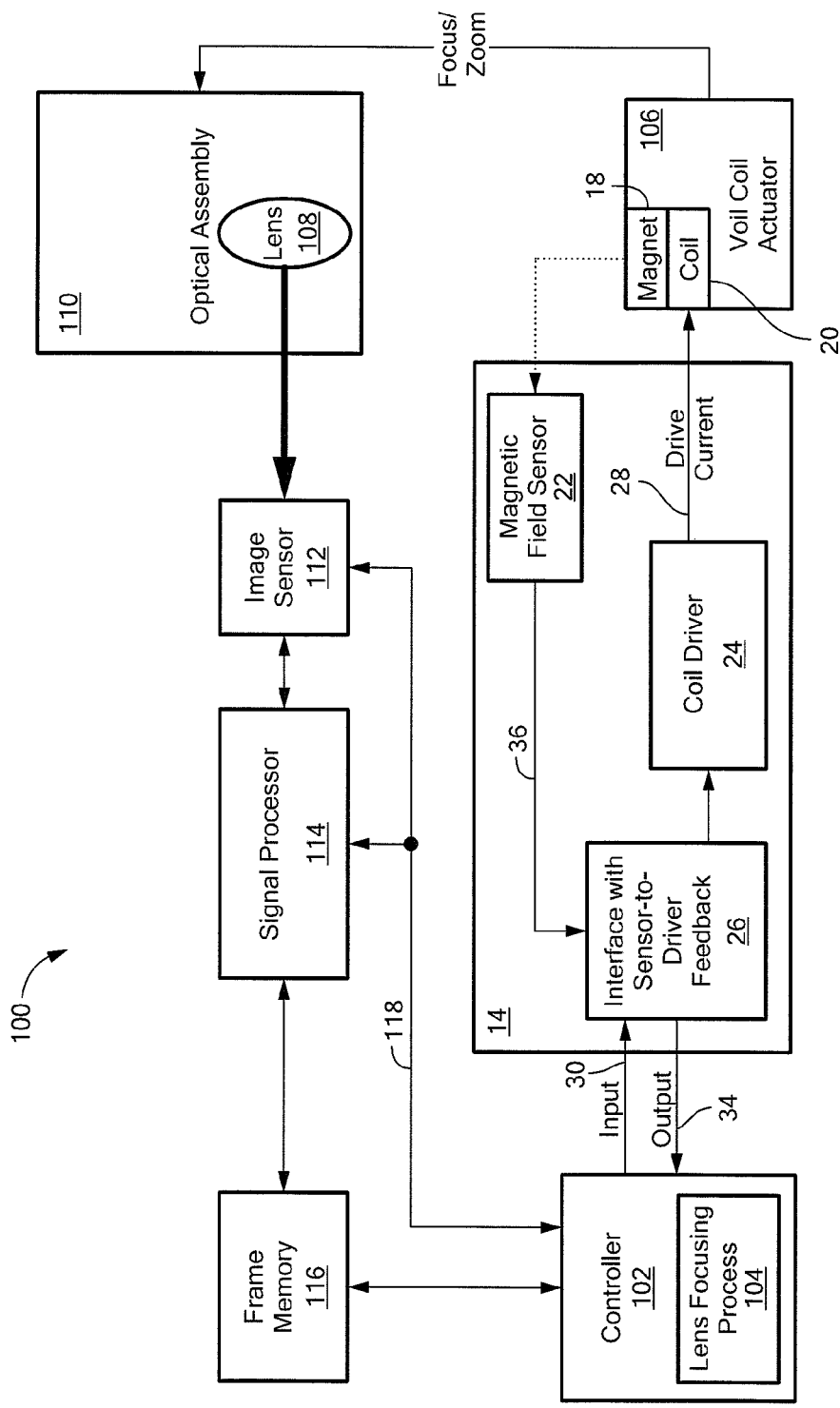
FIG. 7 is a block diagram of an exemplary camera lens focusing system in which a linear motion control device such as that shown in FIG. 1 may be utilized.

The device 14 (FIG. 1), with the feedback mechanism of interface 26, as described above, may be used in a variety of other applications, such as applications that use voice coil actuators. One example, as shown in FIG. 7, is a camera lens focusing module (or "module") 100 as may be used in a mobile phone with camera, also known as a camera phone. Traditionally, digital still cameras used stepper motors as actuators. Because of their size, complexity and power requirements, stepper motors are not well-suited for camera modules in camera phones. One actuator option for phone cameras is the voice coil actuator. Voice coil actuators are useful as drivers in limited motion, high frequency activation applications, such as that of the lens driving device of module 100, as well as other precision instrument applications.

The module 100 includes a controller 102 that executes a lens focusing process 104 and provides control signals to other blocks of the module. The controller 102 may control overall operation of the camera phone and thus switch between telephone and camera functions, or the controller 102 may be dedicated to a camera mode of operation (with a separate controller for handling the telephone mode). The controller 102 is connected to the device 14, which drives a voice coil actuator 106. As indicated earlier with reference to the linear motor control application shown in FIGS. 3-6, the device 14 may be constructed as a semiconductor integrated circuit with voice coil driver and magnetic field sensor integrated on a single substrate. Also, the magnet and device/coil assembly may be similar to that described above with reference to FIGS. 5-6, but with a different coil and coil driver for unidirectional drive. Alternatively, a magnet with a simple spring biasing mechanism could be used.

The voice coil actuator 106 controls the linear movement of a lens 108 of an optical assembly 110 to adjust the lens focus. The coil driver 24 of the device 14 controls the voice coil actuator 106. The module 100 also includes an image sensor 112, a signal processor (SP) 114 and a frame memory 116. The operation of this module will now be described.

Assuming that the controller 102 has switched to a camera function or is in a camera mode, the image sensor 112 is activated, and the controller 102 sends a control signal (timing signal) via control lines 118 to the image sensor 112 to start an image capturing process. An image projected by the lens 108 onto the image sensor 112 is scanned and applied to the SP 114. The controller 102 activates the signal processor 114 to begin auto focus processing. The SP 114 performs sampling, amplification and A/D conversion to an image signal output from the image sensor 112 and outputs the digital image data. The frame memory 116 temporarily stores the digital image data sequentially output from the SP 114. The SP 114 determines a contrast value of the image according to the image data stored in the frame memory 116. Every time the image is captured by the image sensor 112 and that image is stored in the frame memory 116, the SP 114 reads the image data and calculates the contrast value.

The controller 102 outputs a control signal 30 to the linear motion control device 14 to begin focus adjustment. The driver portion of the device 14 generates the drive signal 28 according to the input signal 30 from the controller and the feedback signal 36 from the magnetic field sensor 22. The lens position adjustment by the voice coil actuator 106 results in change in image sharpness. The SP 114 determines contrast value of the image data sequentially captured by the image sensor 112 and compares values between images captured before and after lens movement. The SP 114 detects that the image with best sharpness is obtained when the contrast value that is a peak value is detected and sends a detection signal to the controller 102. The controller 102 sends the appropriate control signal (to the device 14) to move the lens 108 back to the position where the peak contrast value was obtained, that is, the precise position to achieve best sharpness to complete the focus adjustment. Although the SP 114 is described as determining a contrast value, other parameters indicative of optimum focal position may be computed by the SP 114.

The signal 30 provided by the controller to the interface 26 of device 14 may be a PWM input signal. If a PWM input is used, it will be translated into an analog voltage. As was described earlier, the feedback circuitry of the interface 26 is used to drive current through an external voice coil. The current in the coil changes until the position of the lens assembly results in a Hall sensor output voltage that has a predetermined relationship with respect to the input, for example, matches the input (or the PWM converted internal analog signal if a PWM input is used). The Hall sensor output is also available to the controller 102 via the output 34 of the interface 26. In one embodiment, as will be described with reference to FIG. 9, the controller 102 uses this output voltage to implement a focus control scheme via the PWM input. Such focus control can take advantage of the closed loop control of the feedback loop to eliminate mechanical hysteresis and linearize actuator transfer function non-linearities in the camera focus module.

Figure 8:
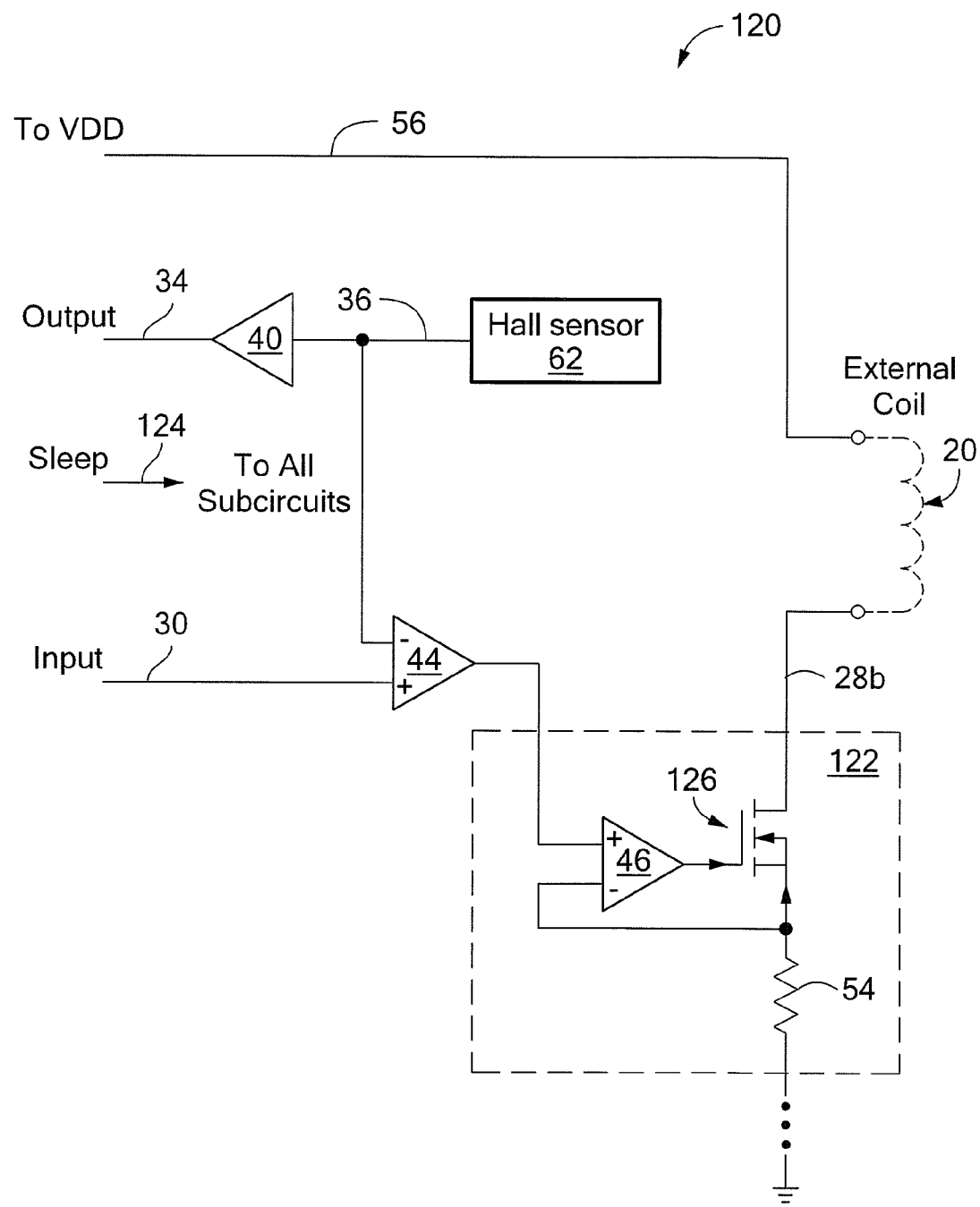
FIG. 8 is a partial block, partial schematic diagram of the linear motion control device (from FIG. 1) implemented with a Hall sensor and a low-side driver for driving an external voice coil actuator such as that shown in FIG. 7.

Referring to FIG. 8, an exemplary embodiment of the device 14 that can be used to drive the voice coil actuator 106 (from FIG. 7) is shown as device 120. In this embodiment, the magnetic field sensor 22 and the coil driver 24 (from FIGS. 1 and 7) are implemented as a Hall sensor 62 and a low-side, voice coil driver 122, respectively. The voice coil driver 122 shown in the figure includes a MOSFET 126 (in addition to components 46 and 54) as output driver. The voice coil driver 122 provides for unidirectional current flow only. The voice coil driver current output, shown as output 28b, connects to the low side of an external coil (coil 20 from FIG. 1).

The device 120 also includes a user-controlled Sleep input 124 that reduces the current consumption when the device 120 is in sleep mode. End users can control the current consumption of the device 120 by applying a logic level signal to the Sleep input. This low power feature makes the device ideal for battery-operated applications such as cellular phones and digital cameras.

Manufacturing tolerances, as well as lens orientation (relative to the direction of gravitational pull and applied loads like acceleration, etc.), do not allow for consistent lens movement in response to current applied to the coil. The lens focusing process 104 employed by the controller 102 (FIG. 7) not only removes mechanical hysteresis (through the use of the sensor-to-driver feedback), but also allows the control system to be precisely calibrated to a specific lens focus module, as will be described with reference to FIG. 9.

Figure 9:
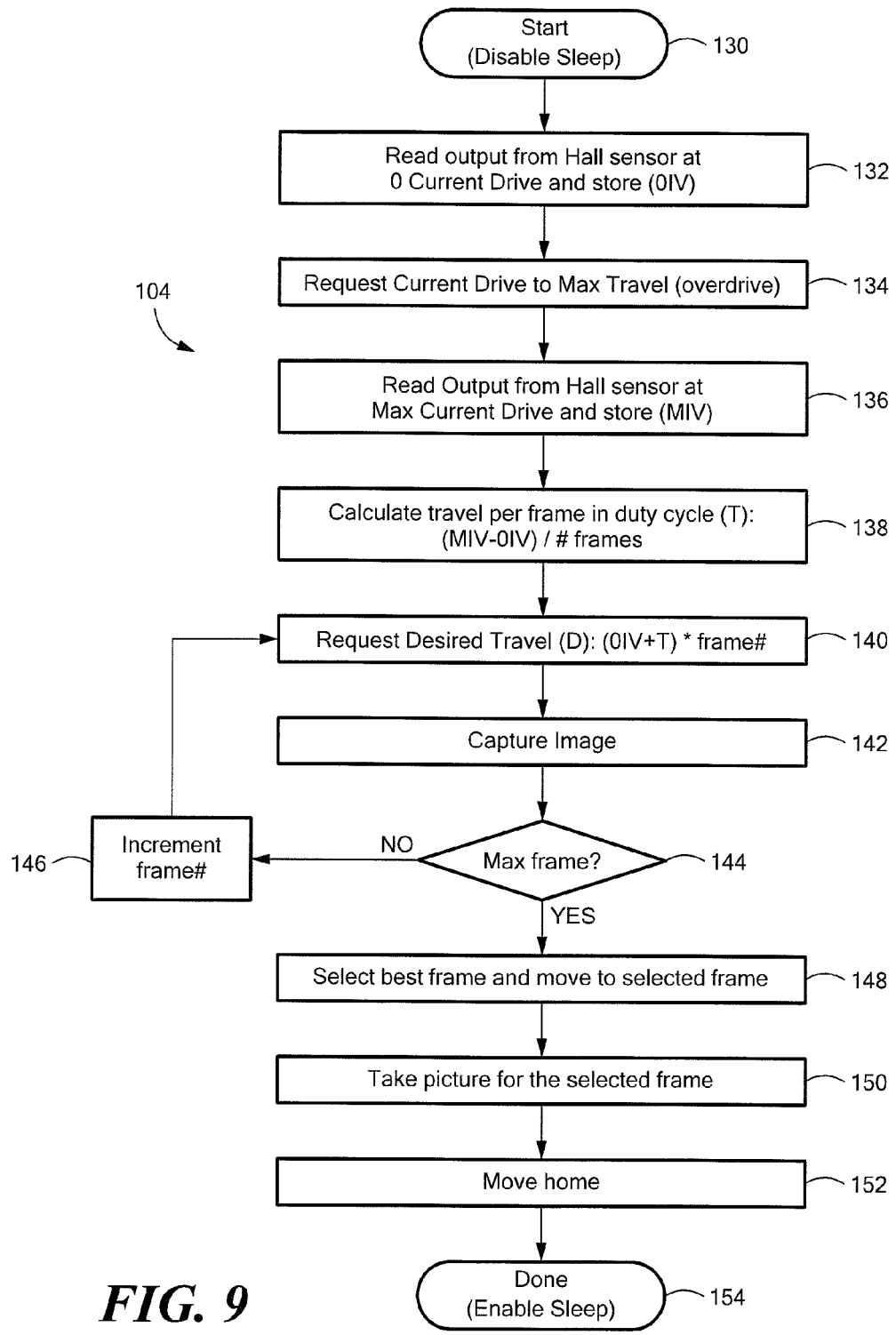
FIG. 9 is a flow diagram illustrating an exemplary camera lens focusing process.

Referring to FIG. 9, the lens focusing process ("process") 104 performed by the controller 102 is shown. Once the process is initiated (block 130), it reads an output value of the device (that is, the output generated by the Hall sensor in whatever form it is presented to the controller) when no current is applied to the coil (0 current drive) and stores that value as a first value, "0IV" (block 132). The process 104 then sends a request, at the input 30, to provide a current to the coil to effect a maximum displacement (or "travel") of the lens (Max current drive)(block 134). The process 104 again reads the output value (from the Hall sensor) corresponding to the maximum lens travel and stores that value as a second value, "MIV" (block 136). The process 104 uses the first and second values to determine a travel value corresponding to travel per frame in duty cycle, more specifically, it determines the difference between the values (that is, MIV-0IV) and divides that difference value by number of frames (block 138). Dividing the lens travel range by the desired number of frames defines a fixed step size for movement. The per-frame value is saved as a third value, "T". Thus, by measuring a baseline magnetic field with no current applied to the coil and then again at a maximum travel/displacement, the process 104 is able to determine a travel range for the lens. The processing actions of the process 104 thus far, those represented by blocks 132, 134, 136 and 138, can be viewed as a calibration process. The calibration process calibrates the linear motion control to the individual lens focus module for precision focusing independent of manufacturing variations of the assembly. The calibration mode thus advantageously reduces focus times during an autofocus application.

Still referring to FIG. 9, once the travel range has been determined, the process 104 requests a desired travel (value "D") at the input of device 14 (block 140). The value "D" is determined by multiplying a value "0IV+T" by "frame#", where "frame#" corresponds to a current frame number. The user can request any value between the two extremes and the system will self adjust to that position based on the feedback in the system. The process 104 causes an image to be captured (block 142) for a current frame. The process 104 determines if the current frame is the maximum frame (block 144). If it is determined that the current frame is not the maximum frame, the process 104 advances to a next frame (by incrementing frame#)(block 146) and returns to block 140 to request a new desired travel, corresponding to a new lens position. If the current frame is the maximum frame, the process 104 causes the selection of the "best" frame (that is, the frame that has the best sharpness, as determined by the SP 114) as being in focus and movement to that frame (block 148). Moving to the selected frame involves moving the lens to the appropriate position and thus requesting a "D" input to device 14 for the selected frame (and frame number). The process 104 enables a picture (at full resolution) to be taken for the selected "best" frame (block 150), causes movement of the lens to home position (block 152) and terminates at block 154. If a sleep mode (via a sleep input, as described earlier with reference to FIG. 8) is available, it may be disabled at block 130 and then enabled at block 154.

In digital camera applications such as the one described with reference to FIGS. 7-9, the closed loop control circuitry of the linear motion control device 14 simplifies the lens focusing process. It provides precision movements of a lens (independent of magnetic variation due to hysteresis in the lens travel) with fewer focusing steps. Consequently, the module 100 can be operated for shorter periods of time, which reduces power consumption in a camera system. It also allows exact re-creation of a previous focus position.

Figure 10:
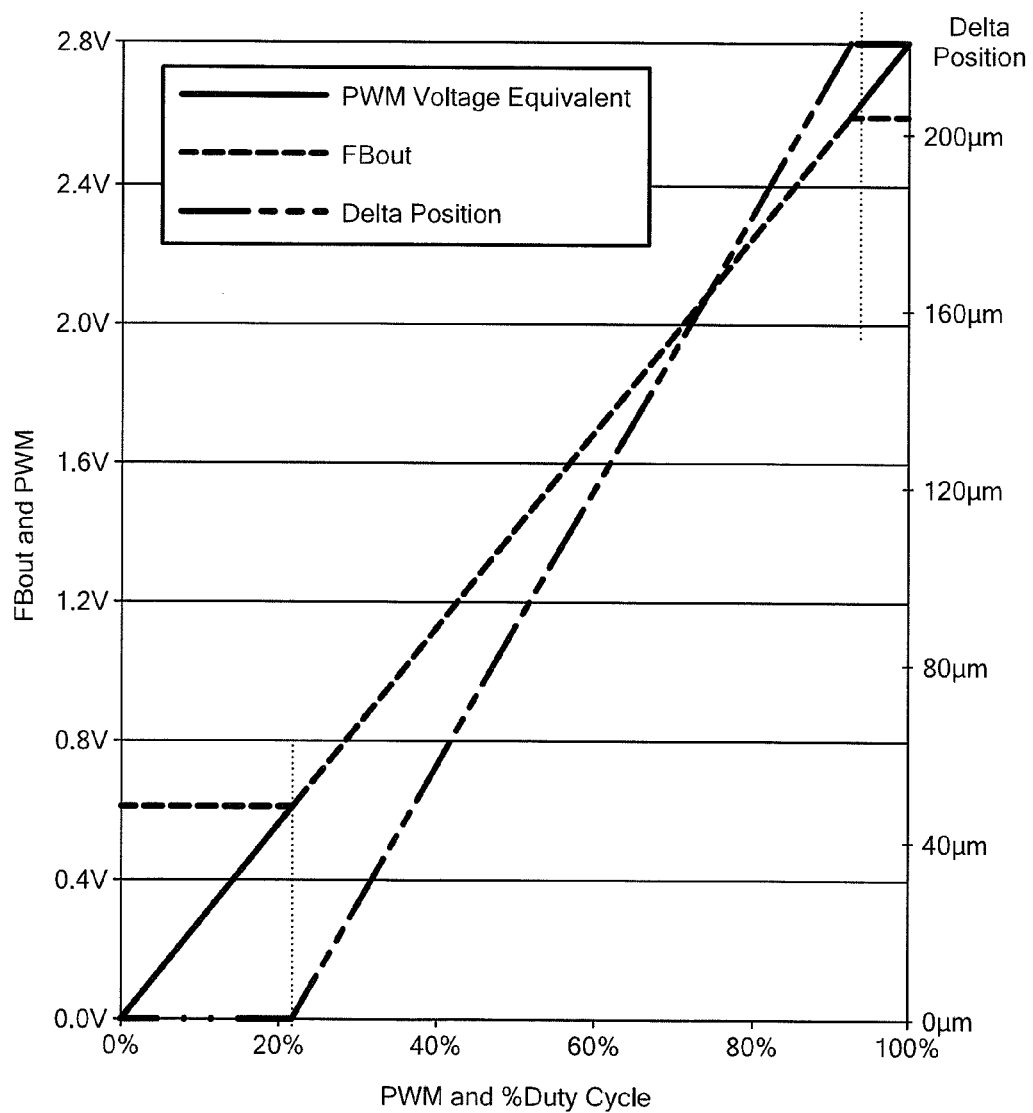
FIG. 10 shows a plot of Position Input Request versus Output Response and Actual Movement for the system of FIGS. 7-8.

FIG. 10 illustrates the relationship between the position input request (labeled "PWM", in Volts), the output response (labeled "FBout", in Volts) and actual movement in terms of position change (labeled "Delta position", in um) during active range. The active range is based on an initial position of 0 um (the equivalent of '0 Gauss') and a complete position change at 220 um. As can be seen in the figure, the use of the linear motion control device with internal feedback serves to produce a highly linear response.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A device comprising:
a coil driver to drive a coil that when driven effects a linear displacement of a motion device having a magnet;
a magnetic field sensor to detect a magnetic field associated with the linear displacement and to produce an output signal in response thereto:
an interface, responsive to requests provided by an external controller and corresponding to desired linear displacements of the motion device, to receive a request as a first input and the magnetic field sensor output signal as a second input, and to produce an input signal to the coil driver having a level indicative of a relationship of the second input with respect to the first input;
wherein, when the motion device is a lens of a camera, each request comprises a value for a desired travel of the lens; and
wherein, when the controller is configured to perform a lens focusing process having a calibration portion and a non-calibrating portion, the requests comprise requests occurring during the calibration portion and requests occurring during the non-calibrating portion.

* * * * *

UNITED STATES PATENT AND TRADEMARK OFFICE
CERTIFICATE OF CORRECTION

PATENT NO.        : 8,084,969 B2                                Page 1 of 1
APPLICATION NO.   : 11/865118
DATED             : December 27, 2011
INVENTOR(S)       : Paul David and Shaun D. Milano It is certified that error appears in the above-identified patent and that said Letters Patent is hereby corrected as shown below:

Column 8, Line 8, delete "sleep" and replace with --Sleep--.

Column 8, Line 39, delete "that when driven effects" and replace with --that, when driven, effects--.

Signed and Sealed this
Fourth Day of December, 2012

David J. Kappos
*Director of the United States Patent and Trademark Office*